United States Patent [19]

Marbot

[11] Patent Number: 5,430,773
[45] Date of Patent: Jul. 4, 1995

[54] DATA SAMPLING APPARATUS, AND RESULTANT DIGITAL DATA TRANSMISSION SYSTEM

[75] Inventor: Roland Marbot, Paris Cedex, France
[73] Assignee: Bull, S.A., Paris, France
[21] Appl. No.: 161,698
[22] Filed: Dec. 6, 1993

Related U.S. Application Data

[63] Continuation of Ser. No. 727,843, Jul. 9, 1991, abandoned.

[30] Foreign Application Priority Data

Jul. 11, 1990 [FR] France ................. 90 08813

[51] Int. Cl.[6] ............................................. H03D 3/24
[52] U.S. Cl. ............................ 375/373; 375/359; 370/108
[58] Field of Search ............. 375/118, 119, 120, 110, 375/113; 370/105.3, 108; 307/271

[56] References Cited

U.S. PATENT DOCUMENTS

| | | | |
|---|---|---|---|
| 3,587,043 | 6/1971 | Mengani | 371/47.1 |
| 3,993,957 | 11/1976 | Davenport | 328/38 |
| 4,715,050 | 12/1987 | Tanaka et al. | 375/111 |
| 4,795,985 | 1/1989 | Gailbreath, Jr. | 375/119 |
| 4,841,551 | 6/1989 | Avaneas | 375/119 |
| 4,873,491 | 10/1989 | Wilkins | 328/155 |
| 4,912,433 | 3/1990 | Motegi et al. | 331/8 |
| 4,922,141 | 5/1990 | Lofgren et al. | 307/595 |
| 4,993,048 | 2/1991 | Williams et al. | 375/81 |
| 5,018,169 | 5/1991 | Wong et al. | 375/119 |
| 5,058,142 | 10/1991 | Otsuka | 375/119 |
| 5,079,519 | 1/1992 | Ashby et al. | 331/1 A |

FOREIGN PATENT DOCUMENTS

| | | | |
|---|---|---|---|
| 0081750 | 6/1983 | European Pat. Off. | |
| 0094865 | 11/1983 | European Pat. Off. | H04L 7/10 |
| 0102598 | 3/1984 | European Pat. Off. | |
| 0220802 | 5/1987 | European Pat. Off. | |
| 0274606 | 7/1988 | European Pat. Off. | |
| 0292943 | 11/1988 | European Pat. Off. | |
| 0313875 | 5/1989 | European Pat. Off. | |
| 0363513 | 4/1990 | European Pat. Off. | |
| 2313827 | 6/1975 | France | H04L 7/04 |
| 8805236 | 7/1988 | WIPO | H04L 7/02 |

OTHER PUBLICATIONS

IBM Technical Disclosure Bulletin, vol. 26, No. 3A, 1983 pp. 990-991, Hernandez "Frequency Multiplier Using Delay Circuits".

Primary Examiner—Stephen Chin
Assistant Examiner—T. Ghebretinsae
Attorney, Agent, or Firm—Kerkam, Stowell, Kondracki & Clarke; Edward J. Kondracki

[57] ABSTRACT

The apparatus for sampling data recurring with a period (R) in the data signal (TS) includes a phasing circuit (43) that adjusts the delay of a clock signal with respect to one edge of the data signal to a value $(n+\alpha)$ R, where n is a positive integer or 0, and $\alpha$ is a positive number less than 1. The invention applies in particular to digital data transmission network systems, and in particular to information processing systems.

26 Claims, 8 Drawing Sheets

DATA SAMPLING APPARATUS, AND RESULTANT DIGITAL DATA TRANSMISSION SYSTEM

This is a Continuation of application Ser. No. 07/727,843, filed Jul. 9, 1991 now abandoned.

CROSS REFERENCE TO RELATED APPLICATIONS

This application is related to the following co-pending applications of applicant:

PCT/US 3212 PHASE-LOCKED LOOP AND RESULTING FREQUENCY MULTIPLIER, U.S. Ser. No. 07/762,018, filed Sep. 18, 1991 and FR/PCT 91/00058, filed in France Jan. 30, 1991, and corresponding to Fr. Appl. 90.01366 filed Feb. 6, 1990;

US 3213 METHOD AND SYSTEM FOR DIGITAL TRANSMISSION OF SERIAL DATA, U.S. Ser. No. 07/727,430, filed Jul. 9, 1991, and corresponding to FR 90.08811, filed Jul. 11, 1990;

US 3214 APPARATUS FOR SERIALIZATION AND DESERIALIZATION OF DATA, AND RESULTANT SYSTEM FOR DIGITAL TRANSMISSION OF SERIAL DATA, U.S. Ser. No. 07/727,429 filed Jul. 9, 1991, corresponding to Fr. 90.08812, filed Jul. 11, 1990;

The subject matter of the aforenoted U.S. applications is hereby incorporated herein by reference.

1. Field of the Invention

The invention relates to an apparatus for sampling data and to the resulting system for digital transmission of data.

The invention applies in general to any apparatus for sampling data that recur with a period R in a serial data signal, including a circuit for phasing a clock signal with respect to one edge of the data signal. The invention is adaptable to any system for digital transmission of serial data. In a synchronous system, the clock signal is transmitted separately from the serial data signal. In a self-clocking system, the clock signal is incorporated into the serial data signal and then recuperated upon reception. In both systems, the clock information is also associated with synchronizing information for framing the eight-bit bytes after sampling of the data. More particularly, the invention is advantageous in high-speed serial transmission systems with a rate of more than 1 Gbps (1 gigabit per second), for example. Systems benefiting the most from the invention are in particular self-clocking network transmission systems, such as local area networks or digital television networks, in particular those for videophones. The application that will be used as an example relates to networks of processors in information processing systems. The object of this application is the interconnection of processors to memories, other processors, or external or internal peripherals.

2. Background of the Invention

Various apparatuses for sampling data that recur with a period R are known. In such apparatus, the clock signal is phased with respect to one edge of the serial data signal in such a way as to correspond, within each period R, to a zone of stability of the data signal. Such phasing optimizes the determination of the logical value of each item of information sampled. Ordinarily, the clock signal is phased at time R/2 following the edge of the data signal. The phasing suffers from two major difficulties. The first difficulty resides in the realization of the duration R/2. Up to now, this duration has generally been predetermined by a fixed delay. It follows that the sampling apparatus is limited to data recurring with the period R or periods very close to this. Sampling at a different frequency requires a different phasing circuit or a manual modification of the preceding phasing circuit. This first difficulty becomes insurmountable for high-speed data sampling. In that case, the period R is very brief, and the half-period becomes longer than the transit time of the clock signal in a component. Given the major deviation in characteristics of components of different semiconductor chips, good control of a slight enough delay has not yet been possible. The second difficulty resides in the random presence of edges in the data signal. The missing edges must then be reconstituted by sophisticated devices and are limited to a certain operating range. This difficulty will become apparent from the following description of the known system.

A recent self-clocking system has been made from integrated circuits and adapted to standardized high-speed transmissions over a fiber distributed data interface (FDDI). In the transmitter, a clock signal on the order of 25 MHz controls the division of each eight-bit data byte into two groups of four bits. Re-encoding converts each group of four bits of data into one group of five bits containing no more than a predetermined number n of consecutive zeroes, in accordance with the known RLLn code, in the RLL3 code, this number is then 3, in practice. The transmission signal is made by putting all the re-encoded groups in series. The re-encoding is thus a form of incorporation of clock information into the serial data transmission signal. On the other hand, the biunivocal correspondence between an original group and the encoded group leaves numerous encoded groups without any matches, and one among them is chosen as the synchronizing information. This synchronizing information is also incorporated into the serial transmission signal. Multiplication of the frequency of the clock signal produces the transmission frequency. With a multiplication factor of 40, the transmission speed can reach 1 Gbps. The transmission signal is encoded in the NRZI mode (non-return to zero inverter). In this mode, each logical "1" is translated into a change of level edge of the encoded signal, while a logical "0" maintains the level of the encoded signal. This signal is transmitted by a transmission link to a receiver. In the receiver, the clock information contained in the transmission signal received is first recovered. The recovery is done by selective spectral Fourier analysis of the digital signal representing each encoded group. The frequency of the restored clock signal is multiplied to reconstitute the frequency of the transmission signal and consequently to decode the groups received. In practice, given the random presence of data edges in the transmission signal, the recuperation circuit includes a resonator. In the absence of edges, the recuperation circuit is fixed to the harmonic of the signal entering the range of the resonator, to constitute an apparent reference edge. Additionally, the synchronizing information is picked up from the transmission signal received. It serves a single time to frame the eight-bit bytes of the output signal of the receiver. The apparatus for data sampling uses a circuit for phasing the clock signal with respect to a real or apparent edge of the transmission signal. The phasing is done by a fixed delay equal to the half-period R/2 of the resonator. This is possible only within a limited range of the resonator.

Moreover, the phasing becomes very intricate and not very reliable for high transmission speeds.

In addition to these difficulties, the transmission system has several major disadvantages. The re-encoding necessary for performing the spectral analysis of the transmitted signal constitutes a loss in terms of data transmission speed. In the RLL3 code for re-encoding half of an eight-bit byte into one group of five bits, the most favorable case for spectral analysis corresponds to a group containing only logical "1"s. Thus the transmission signal has one edge for each bit of the group and has a fundamental component corresponding to twice the recurrence period R of the bits transmitted. The clock component detected by selective Fourier spectral analysis of the transmission signal received is extracted by filtration at the frequency 1/R. The least favorable case occurs in the absence of an edge during three successive periods R. In that case, the frequency of the fundamental component is $\frac{1}{3}R$, the second-order frequency is $\frac{2}{3}R$ and the third-order component corresponds to the fundamental component 1/R of the preceding case. However, the third-order harmonic has a markedly lower amplitude than the fundamental component. It follows that the RLLn re-encoding is limited to very low values of n. For example, a component having an order of 9 to be filtered would be very weak and would be very close to its neighboring components with frequencies of 8/9R and 10/9R. Because of the low amplitude and the size of the three components, and above all the deviation in the electrical characteristics of the components, such filtration would prove to be impossible to actually achieve. In conclusion, the re-encoding that is necessary in practice is a major constraint and limits the speed of data transmission.

Another disadvantage of the current method resides in the insertion of synchronizing information into the transmission signal. This information is added to the clock information introduced into the transmission signal in the form of a re-encoding of the half-eight-bit bytes of data. Furthermore, this information comprises an encoded group that does not correspond to a datum and is used only a single time. On that occasion, synchronizing done under poor conditions does not enable restoration of the data upon reception.

OBJECTS AND SUMMARY OF THE INVENTION

The invention overcomes the difficulties in design and embodiment of prior art sampling apparatus and overcomes the disadvantages of prior art transmission systems.

The object of the invention is to obtain automatic phasing at a predetermined position within each period R. Another object is to obtain reliable automatic phasing that is independent of technologically induced deviations among different integrated circuits and is independent of the data speed.

An apparatus according to the invention for sampling recurrent data with a period R in a data signal, including a circuit for phasing a clock signal with respect to one edge of the data signal, is characterized in that the phasing circuit adjusts the delay between the clock signal and the edge of the data signal to a value $(n+\alpha)R$, where n is a positive integer or zero, and $\alpha$ is a positive number less than 1.

Advantageously, the edge of the data signal is a synchronizing edge recurring with a period NR, where N is an integer greater than or equal to 1.

The result is a transmission system according to the invention, including a transmitter of a data signal recurring with a period R and of clock information; and a receiver including a sampling apparatus having a circuit for phasing a clock signal for originating in the clock information with respect to one edge of the data signal, characterized in that the phasing circuit adjusts the delay between the clock signal and the edge of the data signal to a value $(n+\alpha)R$, where n is a positive integer or 0, and $\alpha$ is a positive number less than 1.

Advantageously, the clock information in a self-clocking system is constituted by a synchronizing edge recurring at a period NR, where N is an integer greater than or equal to 1. This edge may constitute both clock and synchronizing information.

BRIEF DESCRIPTION OF THE DRAWINGS

The characteristics and advantages of the invention will become clearly apparent from the ensuing description given by way of example, taken in conjunction with the accompanying drawings.

DESCRIPTION OF THE PREFERRED EMBODIMENTS

Figure 1:
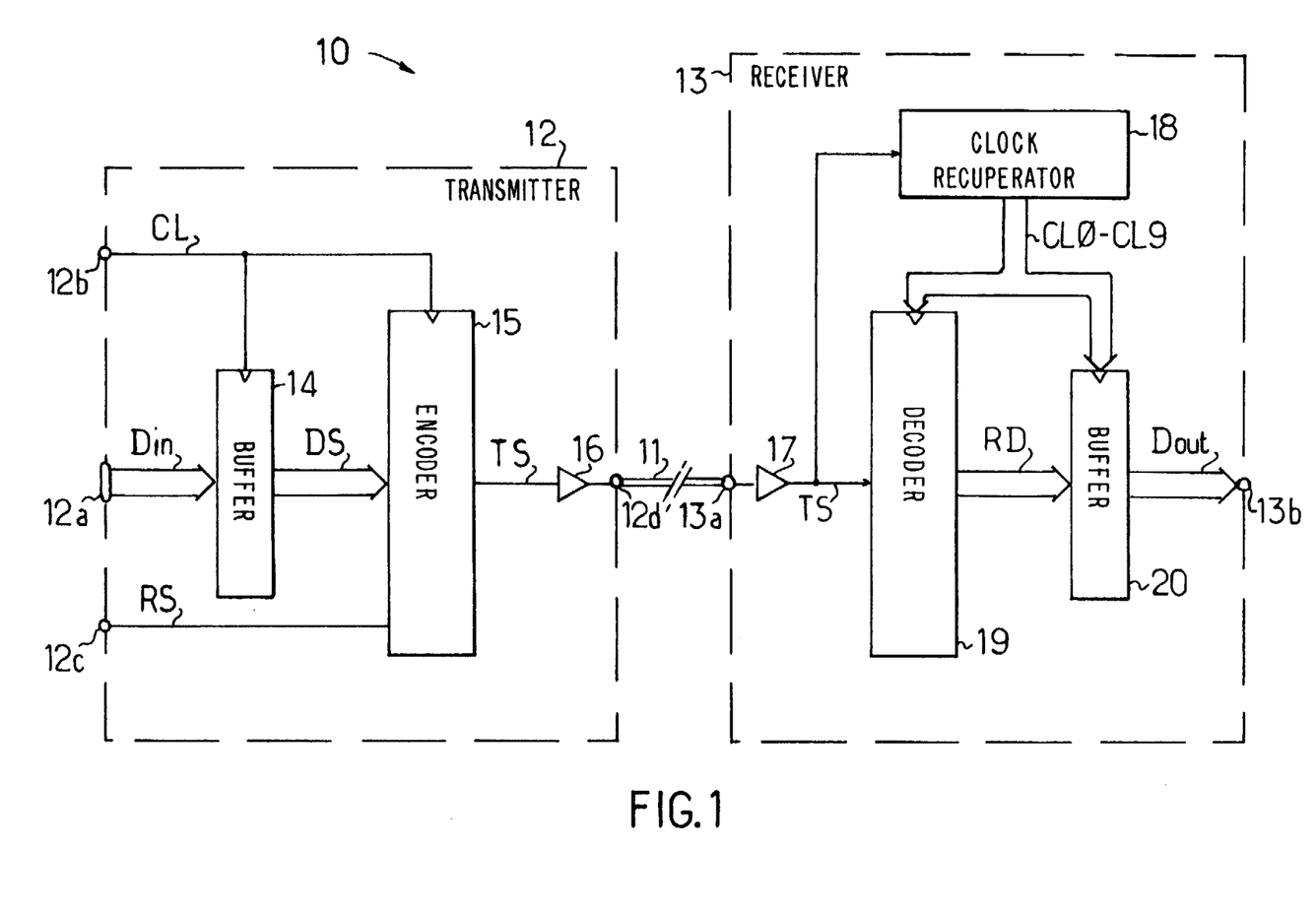
FIG. 1, in the form of a mimic diagram, illustrates a self-clocking digital transmission system according to the invention.

FIG. 1 is a mimic diagram of a self-clocking digital transmission system 10 according to the invention. The system 10 includes a transmission line 11, a transmitter 12 and a receiver 13. The transmitter 12 includes: an input terminal 12a that receives the parallel data of an input signal Din, a clock input terminal 12b receiving a clock signal CL, an input terminal 12c receiving a reset signal RS, and an output terminal 12d connected to the line 11; an input buffer 14 receiving the input signal Din and pilot-controlled by the clock signal CL to furnish a parallel data signal DS; a serializer-encoder 15 receiving the clock signal CL, the parallel data signal DS and the reset signal RS and furnishing a serial transmission signal TS; and an output amplifier 16 applying the transmission signal TS to the output terminal 12d of the transmitter 12. The receiver 13 includes: an input terminal 13a connected to the line 11 to receive the transmission signal TS and an output terminal 13b furnishing the parallel data of the output signal Dout; an input amplifier 17 connected to the input terminal 13a and shaping the transmission signal TS received from the line 11; a clock recuperator 18 receiving the transmission signal TS from the amplifier 17 to restore the auxiliary clock signals CL0–CL9; a deserializer-decoder 19 receiving the transmission signal TS and the auxiliary clock signals CL0–CL9 and producing a signal of restored parallel data RD; and an output buffer 20 receiving the restored parallel data signal RD and some of the auxiliary clock signals CL0–CL9 and furnishing the data output signal Dout to the output terminal 13b of the receiver 13.

In the system 10, the input signal Din is a byte of eight data bits associated with a parity bit. This group of nine bits of the input signal comprises an input data word. The input buffer 14 is a conventional element, for example comprising nine edge registers, each respectively receiving the nine parallel bits of the input signal word Din and controlled by the clock signal CL. The amplifiers 16 and 17 may also be conventional elements.

Figure 2A:
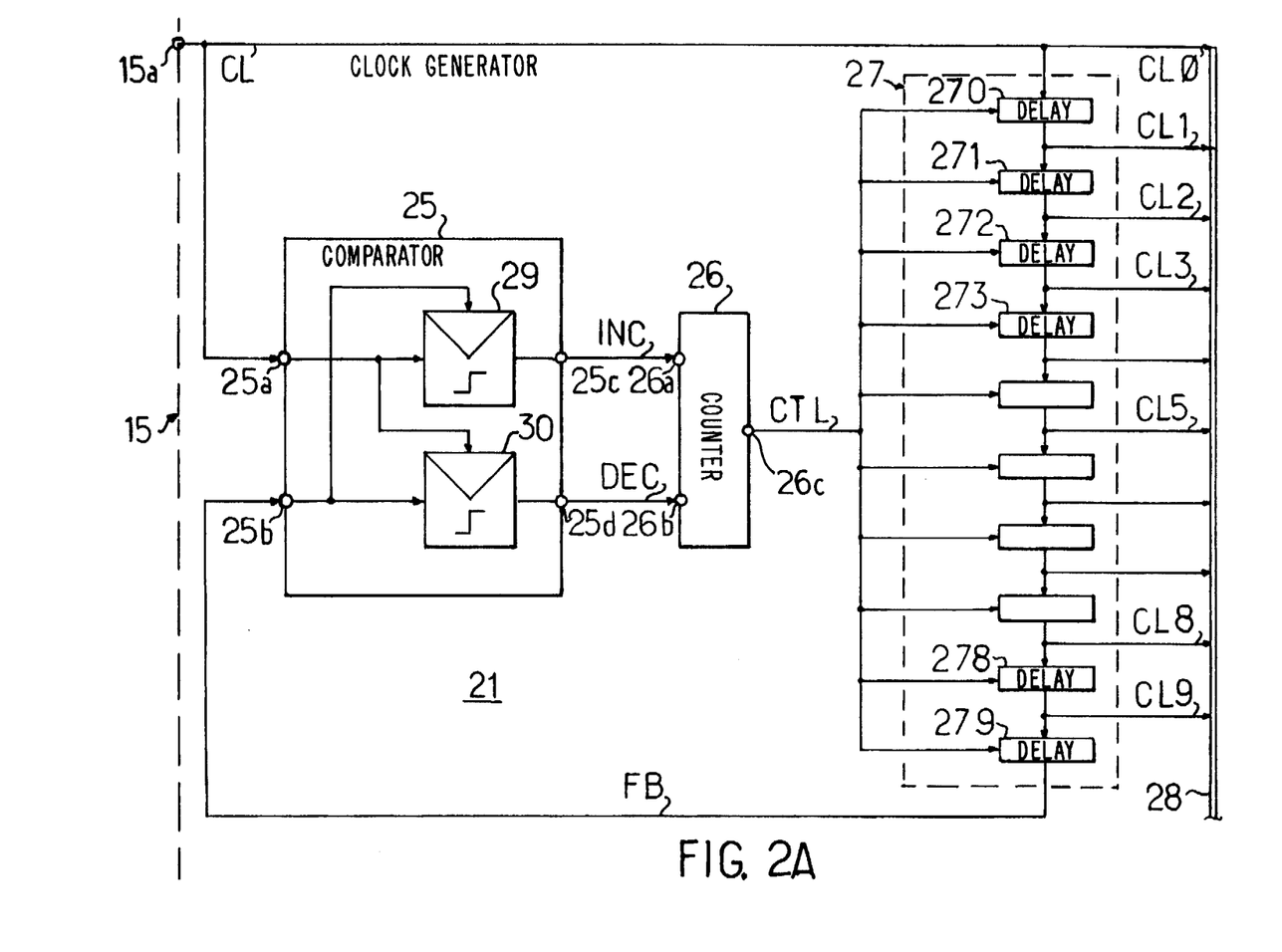
FIGS. 2A and 2B schematically illustrate the structure of a serializer-encoder included in the transmitter of the transmission system of FIG. 1 and employing the method according to the invention.
Figure 2B:
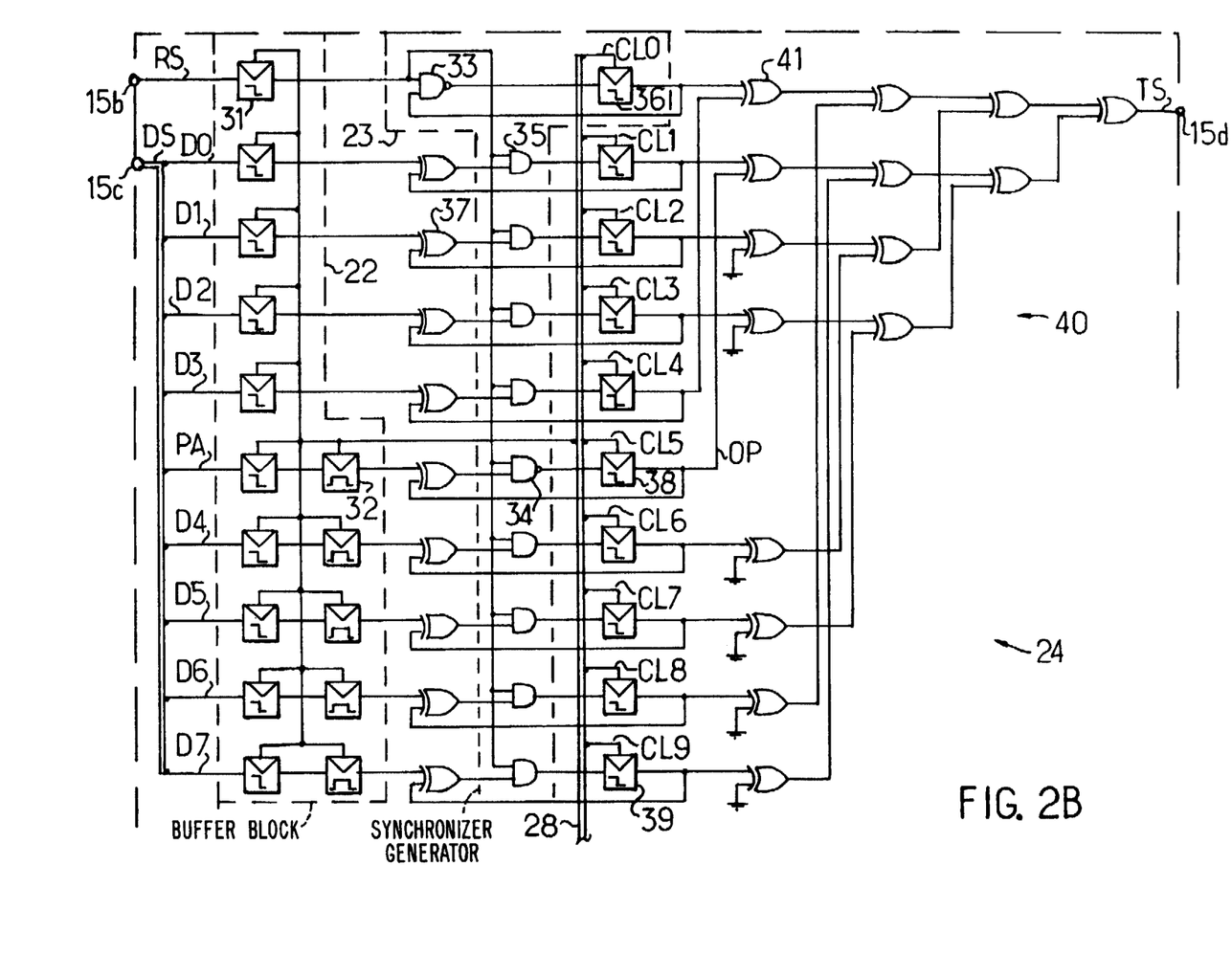

FIGS. 2A and 2B schematically show the electrical circuit of the serializer-encoder 15. The serializer-encoder 15 has, in FIG. 2A, one input 15a receiving the clock signal CL and, in FIG. 2B, one input 15b receiving the reset signal RS, one input 15c receiving the data input signal DS, and one output 15d furnishing the transmission signal TS. It is composed of an auxiliary clock generator 21 connected to the input 15a of the serializer-encoder 15 and shown in FIG. 2A, a buffer block 22, a synchronizer generator 23, and a serializer-encoder block 24, which are shown in FIG. 2B.

The auxiliary clock generator 21 shown in FIG. 2A comprises a phase-locked loop, such as that described in French Patent Application No. 90 01366 filed on Feb. 6, 1990 by the present applicant. The generator 21 includes: the input terminal 15a; a phase comparator 25 having a first input terminal 25a connected to the input terminal 15a, a second input terminal 25b, and two output terminals 25c, 25d; an up-down counter 26 having two input terminals 26a, 26b respectively connected to the output terminals 25c, 25d of the phase comparator 25, and one output terminal 26c; a phase delay circuit 27 comprising ten delay elements 270–279 connected in series between the two input terminals 25a and 25b of the phase comparator 25 and each provided with a control terminal connected to the output terminal 26c of the up-down counter 26; and an output 28 comprising a clock bus connected to the respective output terminals of the delay elements 270–279.

The phase comparator 25 is composed of two registers 29 and 30 that are sensitive to the leading edges. The register 29 has its data input connected to the input terminal 25a, its clock input connected to the input terminal 25b, and its output connected to the output terminal 25c. The register 30, similarly, has its data input connected to the input terminal 25b, its clock input connected to the input terminal 25a, and its output connected to the output terminal 25d.

Figure 3:
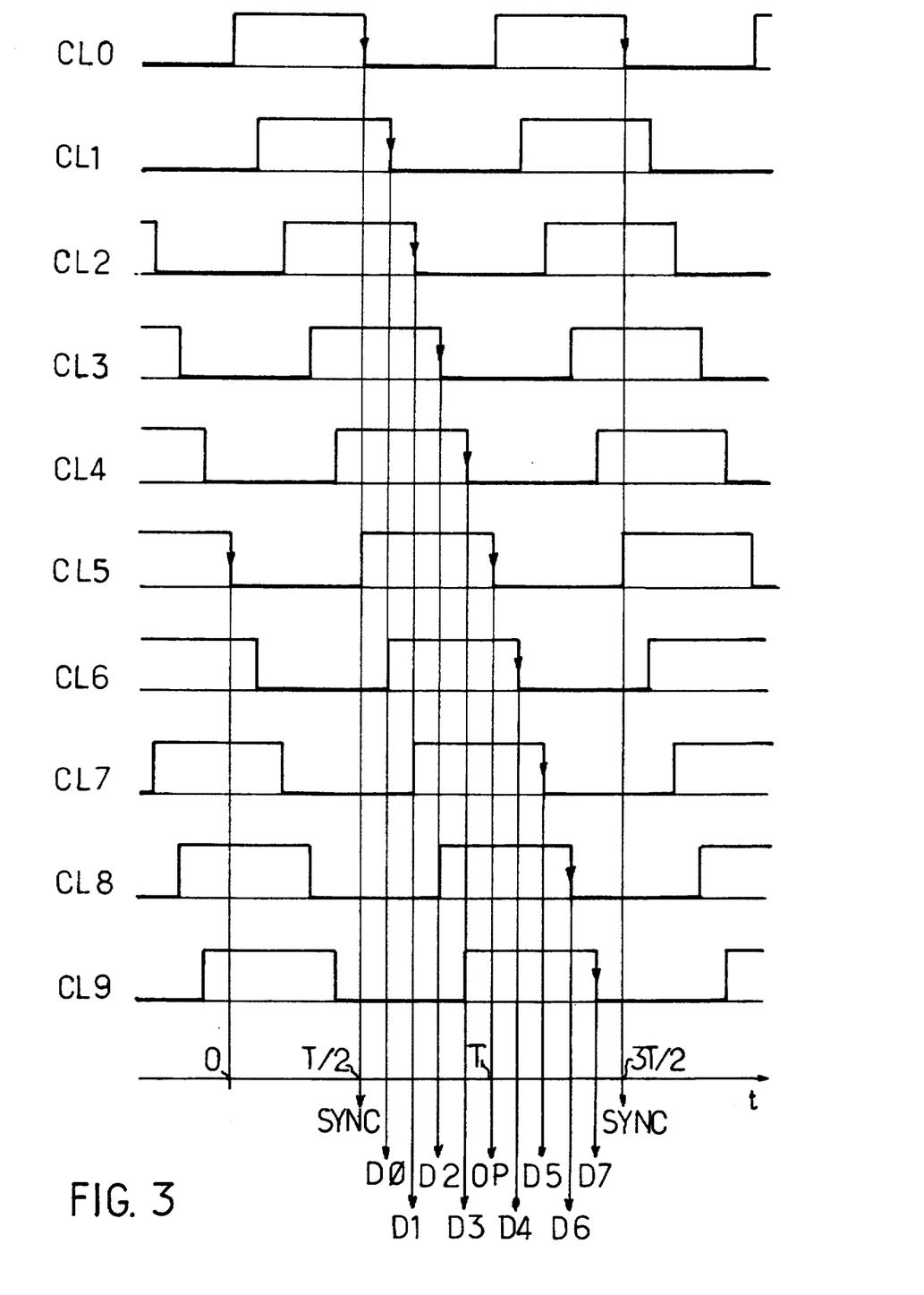
FIG. 3 shows the wave forms of the auxiliary clock signals furnished by the circuit shown in FIG. 2A and illustrates the function of the circuit shown in FIG. 2B.

FIG. 3 illustrates the wave forms, with respect to the time axis t, of the ten input signals CL0–CL9 of the respective delay elements 270–279 of the phase delay circuit 27. The signals CL0–CL9 are applied to the clock bus 28. The signal CL0 corresponds to the clock signal CL. The clock signal CL0 illustrated is a square signal of period T. The output signal of the last delay element 279 comprises a negative feedback signal FB applied to the negative feedback terminal 25b of the phase comparator 25. The comparator 25 then compares the phase of the negative feedback signal FB with the phase of the clock signal CL=CL0. The two output terminals 25c and 25d of the phase comparator 25 furnish an incrementation signal INC and a decrementation signal DEC, respectively. In response, the up-down counter 26 furnishes the control signal CTL applied to the respective control terminals of the ten delay elements 270–279. In the conventional manner, each delay element is composed of a predetermined number of elementary delay cells. The control signal CTL represents a digital value, which is applied to each delay element to cause it to vary the duration of the delay. The possible range of variation of the duration of the delay of a delay element in the course of a period T of the clock signal CL corresponds to a predetermined fraction 1/P of the maximum extent of the variation and duration of a delay element. In other words, a given integral number P of periods T is necessary to pass between the two extreme values of the maximum extent of variation of the delay of one element.

In operation, the clock signal CL is delayed successively by the ten delay elements 270–279. The ten successive delays produced by the elements 270–279 are each and in principle divide the period T of the clock signal CL. If this is done precisely in practice, the signals CL and FB entering into the phase comparator 25 and applied to the registers 29 and 30 have the same phase and the same frequency. The signals DEC and INC furnished by the registers 29 and 30 thus have the same logical value. The up-down counter 26 is accordingly not activated and leaves the control signal CTL unchanged. The ten clock signals CL0–CL9 are correctly phase-shifted ed with respect to one another by the same value T/10. In practice, a margin of tolerance m of the phase displacement between the clock signal CL and the negative feedback signal FB is determined. A phase displacement within the margin m leaves the signals INC and DEC unchanged and accordingly is not likened to a phase displacement requiring correction. The margin m may be determined by the establishment times of the registers 29 and 30 and/or by the relative delays between the data input and clock input signals of each register, for example. The width of the margin m determines the precision of the phase comparison effected by the comparator 25. Typically, it is on the order of 50 ps for a period T=5 ns of the clock signal CL.

If the negative feedback signal FB is leading the clock signal CL in phase, the decrementation signal DEC has the logical value of 0 and the incrementation signal has the value of 1. The up-down counter 26 is then incremented so that the control signal CTL will increase by equal amounts the durations of the delays produced by the elements 270–279. On the other hand, if the negative feedback signal FB is lagging behind the clock signal CL, then the incrementation signal INC has the value 0 and the decrementation signal DEC has the value 1. The up-down counter 26 is decremented so that the control signal CTL will shorten the durations of the delays produced by the elements 270–279 equally. Consequently, any phase displacement beyond the margin of tolerance m is corrected for all the delay elements 270-279, to re-establish the desired phase displacements.

The digital phase control employed in the phase-locked loop comprising the auxiliary clock generator 21 offers a major advantage. If the clock signal CL is interrupted, then the negative feedback signal FB is also interrupted on principle. The registers 29 and 30 of the phase comparator 25 no longer receive any signal at their clock input and accordingly each maintains the most recent state of the transmission. The up-down counter 26 likewise maintains its most recent state, and consequently the state of the delay elements 270-279. In other words, the generator 21 maintains the most recent state of the transmission. It follows that the re-appearance of the first edge of the clock signal CL will immediately produce the correct output signals CL0-CL9, if the frequency of the clock signal CL has not changed. Otherwise, the delays are adjusted by the up-down counter 26 upon the second cycle of the clock signal CL, with a view to producing the desired output signals CL0-CL9. In conclusion, the duration for establishment of correction operation of the generator 21 may be zero, or at worst equal to the aforementioned number P of periods T of the clock signal for passing between the two extreme values for the extent of variation of the duration of each delay element. Consequently, the startup of the generator 21, or the reactivation of a transmission line, transpires in a very brief time.

A second advantage is the wide band of operating frequencies of the auxiliary clock generator 21. The width of the band depends essentially on the range of variable delays of each delay element 270-279, as will become apparent hereinafter.

Another advantage is that the clock signal CL and the negative feedback signal FB, which are compared by the phase comparator 25, in principle have the same frequency. The structure of the comparator 25 may be quite simple, like that shown. Furthermore, the comparator can accommodate a wide band of operating frequencies. In summary, the auxiliary clock generator 21 solves all the problems that the use of a conventional phase-locked loop or PLL presents. Another advantage offered by the generator 21 resides in its adaptation to the various forms of the clock signal CL. In the example shown, the cyclic ratio of the clock signal can be arbitrary.

Figure 4A:
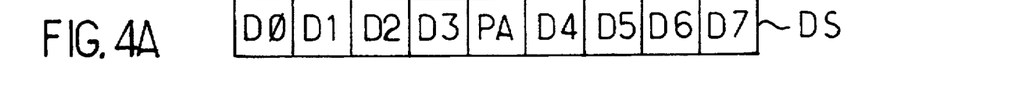
FIGS. 4A and 4B, respectively, show the general structure of a data signal word and of a transmission signal word, while FIGS. 4C and 4D, on the one hand, and 4E, 4F, on the other, respectively illustrate two digital examples relating to the aforementioned two words.

In FIG. 2B, the buffer block 22 of the serializer-encoder 15 is connected to the input terminal 15b receiving the reset signal RS, to the input terminal 15c receiving the parallel input signal DS, and to the clock bus 28 of the generator 21 shown in FIG. 2A. By way of example, FIG. 4A shows the structure of one word of the data input signal DS applied to the terminal 15C of the serializer-encoder 15. The word is composed of eight data bits D0-D7 and one parity bit PA placed between the middle data bits D3 and D4. The buffer block 22 is composed of ten registers 31 that are sensitive to the trailing edges, and five level registers 32, each having one data input, one clock input, and one output. All the registers 31 and 32 have their clock input receiving the clock signal CL5 of the clock bus 28 of the auxiliary clock generator 21. The ten registers 31 have their data inputs receiving the reset signal RS, the first four data bits D0-D3, the parity bit PA, and the last four data bits D4-D7 of the input signal DS, respectively. The outputs of the registers 31 relating to the parity bit PA and to the last four data bits D4-D7 are applied to the respective signal inputs of the level registers 32.

The synchronizing generator 23 includes two NAND gates 33, 34 with two inputs each, and eight AND gates 35 with two inputs each. The first inputs of the gates 33, 34 and 35 are connected to the output of the register 31 relating to the reset signal RS. The generator 23 also includes a trailing edge register 36 having its clock input receiving the clock signal CL0 of the clock bus 28, its data input connected to the data output of the NAND gate 33, and its output applied to the second input of the NAND gate 33.

The serializer-encoder block 24 includes nine EXCLUSIVE-OR gates 37 with two inputs each, the first inputs of which are connected to the corresponding outputs of the four registers 31 relating to the first four data bits D0-D3 and to the respective outputs of the five registers 32. The outputs of the gates 37 relating to the data bits D0-D7 are connected respectively to the second inputs of the AND gates 35, and the output of the gate 37 relating to the parity bit PA is connected to the second input of the NAND gate 34. The serializer-encoder block 24 includes a trailing edge parity register 38, having its data input connected to the output of the NAND gate 34, and eight trailing edge data registers 39, the respective data inputs of which are connected to the outputs of the AND gates 35. The parity register 38 is controlled by the clock signal CL5, and the eight data registers 39 are controlled by the clock signals CL1-CL9 of the bus 28. The respective outputs of the registers 38 and 39 are applied to the second inputs of the corresponding EXCLUSIVE-OR gates 37. Finally, the serializer-encoder block 24 includes a logical adder 40, consisting of a tree with four stages of EXCLUSIVE-OR gates 41 with two inputs each. The two inputs of the first gate 41 of the first stage receive the respective output signals of the synchronizing register 36 and the register 39 for the datum D3. The second gate 41 of the first stage receives the respective output signals of the parity register 38 and the register 39 for the datum D0. The other six gates 41 of the first stage have their first inputs connected to the outputs of the registers 3 for the data D1, D2, D4, D5, D6 and D7, and their second inputs are connected to ground. The respective outputs of the gates 41 of the first stage relating to the synchronizing bit and to the data bits D0-D2, on the one hand, and those relating to the data bits D7, D6, D5 and D4, on the other, respectively supply the two inputs of the four gates 41 of the second stage of the adder 40. The outputs of the first and third gates 41 of the second stage and those of the other two gates 41 respectively supply the two gates 41 of the third stage, which in turn supply the gate 41 of the last stage. The output of that gate furnishes the transmission signal TS to the output terminal 15d of the serializer-encoder 15.

The operation of the serializer-encoder 15 will now be described, referring to FIGS. 2B, 3 and 4A-4F. Before initialization of the system 10, the reset signal RS applied to the input 15b is in the logical 0 state, such that the outputs of the gates 33, 34 and 35 are all inactivated. Upon initialization, they are activated by the setting of the reset signal RS to the level of logical 1. Let it be assumed that the clock signal CL is applied to the input 15a and the clock bus 28 furnishes the ten auxiliary clock signals CL0-CL9 shown in FIG. 3. The registers 31 are controlled at time t=0 by the trailing edge of the clock signal CL5 in phase opposition with the clock signal CL0. The reset signal RS and the nine bits of the data input signal DS shown in FIG. 4A are input into the respective registers 31. In the synchronizing signal generator 23, the logical 1 state of the output of the gate 33 is memorized in the register 36 controlled by the trailing edge of the clock signal CL0. Given that the operation of the system 10 is ruled by the logical 1 state of the signal RS, the gate 36 changes state at each trailing edge of the clock signal CL0.

The data bits D0–D3 memorized in the respective registers 31 are transmitted to the corresponding gates 37. Each gate 37, with the register 39, forms an elementary encoding cell of the NRZI type. It has been seen that the gate 35 is simply an element for activating the operation of the cell. If the data bit D0, for example, has the state of logical 1, the trailing edge of the clock signal CL1 will change the logical state of the output of the register 39. Contrarily, if D0 has the state of logical 0, the logical state of the output signal of the register 39 is unchanged by the passage of the trailing edge of the clock signal CL1. FIG. 3 shows the succession of encoding of the data bits D0– D3 corresponding to their serialization at the speed, or rate, R of T/10.

Meanwhile, it is apparent from FIG. 3 that the encoding of the parity bit PA occurs at time t=T, where the registers 31 are controlled to memorize the bits of the next word of the data input signal DS. The registers 32 prevent loss of the parity bit PA and of the data bits D4–D7 of the first word. Consequently, the serialization continues by the encoding of the parity bit PA, inverted by the NAND gate 34, to constitute an odd parity bit OP, and then by the encoding of the data bits D4–D7. The encoding and serialization of the synchronizing and data bits of the next word recorded at time t=3T/2 continues in the manner that has just been described.

The signals furnished successively by the encoding cells are added in the adder 40 to form the serial transmission signal TS which is applied to the output 15d of the serializer-encoder 15. The adder 40, with the phase-locked loop of the auxiliary clock generator 21, constitutes a frequency multiplier with a multiplication factor equal to the number of phase displacements of the clock signal CL in one period, the number being 10 in the example shown. A more-detailed description of a frequency multiplier of this kind can be found in the French Patent Application by the present applicant referred to earlier above.

The invention profits from the embodiment of the logical adder 40 in the form of integrated circuits. The uniformity of the characteristics of transformers in the same integrated circuit makes it possible to equalize the propagation times between the clock signal outputs CL0 and CL9 and the output 15d of the adder. This assures the formation of a high-quality multiple frequency.

The frequency multiplier that has just been described enjoys all the advantages of both the phase-locked loop 21 and a logical adder. Those that can be mentioned in particular are its simplicity, reliability, and adaptability to a wide band of operating frequencies. For example, with a clock signal CL of period T varying between 5 ns and 10 ns, and with the delay circuit 27 having ten delay elements each capable of producing a delay varying from 500 to 1000 ps, it is possible to obtain a speed of between 1 and 2 Gbps at the output 15d of the serializer-encoder 15.

Figure 4B:
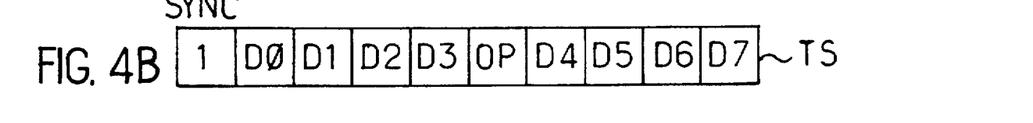
Figure 4C:
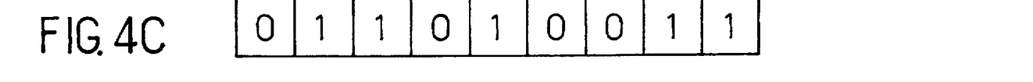

FIG. 4B shows the structure of one word of the serial transmission signal TS. Each word of the signal TS includes the word of signal data DS, preceding by the synchronizing bit SYNC, which is always equal to one. FIG. 4C shows an illustrative example of a word of the data signal DS, in which the number of data bits of logical 1 value is even, so that the odd parity bit OP thus has the value of logical 1. This word produces the wave form of the transmission signal TS shown in FIG. 4D relating to FIG. 4B. It should be noted that the synchronizing bit SYNC is translated into a leading edge comprising a synchronizing edge SE in the transmission signal TS. FIG. 4E shows the case of a word of the data input signal DS in which the odd parity bit OP has the value of logical 0, corresponding to an odd number of data bits of logical 1 value. It is apparent from FIG. 4F in conjunction with FIG. 4B that the synchronizing bit SYNC is again translated into a leading edge comprising the synchronizing edge SE in the transmission signal TS. In summary, the addition of a synchronizing bit SYNC of logical 1 value in each data word incorporating an odd parity bit OP translates into the same synchronizing edge SE in the transmission signal TS, which in the exemplary embodiment shown is a leading edge.

In the receiver 13 of the system 10 according to the invention, the transmission signal TS received at the input 13a is shaped and amplified in the amplifier 17, and then applied to the clock recuperator 18 and to the deserializer-decoder 19.

Figure 5:
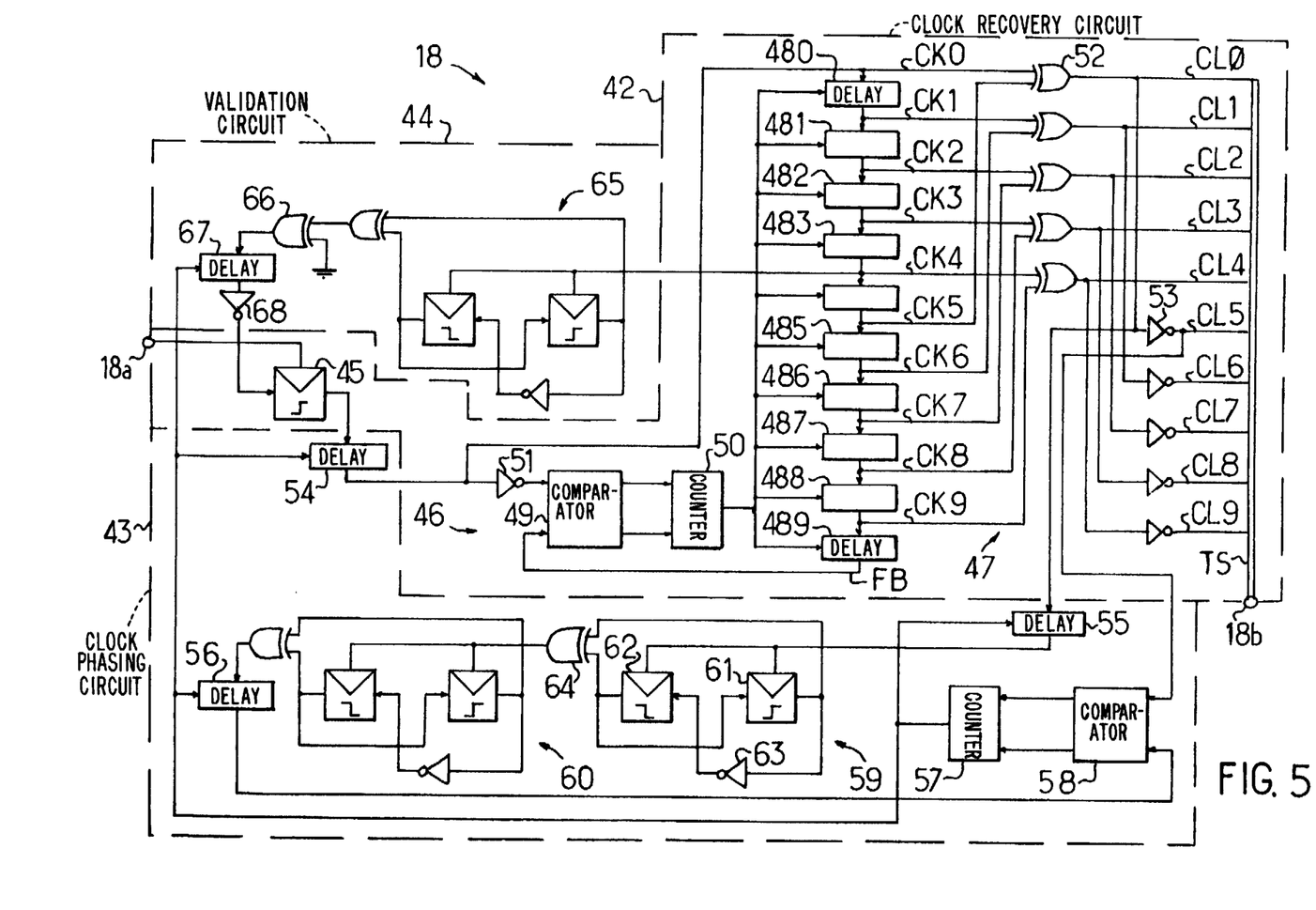
FIG. 5 schematically illustrates the electrical circuit of the clock recuperator according to the invention, which is included in the receiver of the transmission system shown in FIG. 1.

FIG. 5 schematically illustrates the electrical circuit of the clock recuperator 18. It has one input 18a for the transmission signal TS and an output bus 18b for the ten auxiliary clock signals CL0–CL9 recovered in the transmission signal TS. It includes a clock recovery circuit 42, a clock phasing circuit 43, and a validation circuit 44.

The clock recovery circuit 42 includes a leading edge input register 45, a phase-locked loop 46 similar to the auxiliary clock generator 21 describes in conjunction with FIG. 2A, and a logical adder 47. The input register 45 receives the transmission signal TS at its clock input. Its output is connected to the input of the phase-locked loop 46, embodied by ten serial delay elements 480–489, a phase comparator 49, an up-down counter 50, all identical in structure to those of the circuit 21, and an inverter 51. The ten input signals of the respective delay elements 480–489 comprise intermediate clock signals CK0–CK9, while the negative feedback signal FB originating in the last delay element 489 is applied to the negative feedback input of the phase comparator 49. The other input of the phase comparator 49, by way of the inverter 51, receives the output signal of the register 45. The delay elements 480–489 are controlled by the output signal of the up-down counter 50 as a function of incrementation and decrementation signals furnished by the phase comparator 49. It will be seen hereinafter that the intermediate clock signals CK0–CK9 have a frequency that is half that of the clock signals CL0–CL9. The logical adder 47 and the phase-locked loop 46 form a frequency multiplier with a factor of 2 to furnish the clock signals CL0–CL9 on the output bus 18b of the clock recuperator 18. The adder 47 includes five EXCLUSIVE-OR gates 52 with two inputs each and five inverters 53. The gates 52 have their first inputs respectively receiving the intermediate clock signals CK0–CK4, their second inputs respectively receiving the other signals CK5–CK9, and their respective outputs furnishing the clock signals CL0–CL4. These five clock signals are inverted by the five respective inverters 53 to furnish the other five clock signals CL5–CL9.

The clock phasing circuit 43 includes a first delay element 54 receiving the output signal of the input register 45 and supplying the input of the inverter 51 and the input of the phase-locked loop 46, which corresponds to the intermediate clock signal CK0; a second delay element 55 receiving the intermediate clock signal CK0; and a third delay element 56. These three delay elements have a structure similar to that of the delay elements 480–489. Their delay is controlled by the output signal of an up-down counter 57 in response to the incrementation and decrementation signals furnished by a phase comparator 58. The comparator 58 receives the clock signal CL5 and the output signal of the third delay element 56 as a negative feedback signal. The second delay element 55 receives the clock signal CL0 and furnishes an output signal to the input of a first delay cell 59 connected in series with a second, identical delay cell 60 furnishing the input signal of the third delay element 56. Each delay cell 59, 60 is composed of a leading edge register 61, a trailing edge register 62, an inverter 63, and an EXCLUSIVE-OR outlet gate 64 having two inputs. The output signal of the delay element 55 is applied to the respective clock inputs of the registers 61 and 62. The output of the register 62 is connected to the data input of the register 61, the output of which is connected by way of the inverter 63 to the data input of the register 62. The respective output signals of the registers 61 and 62 are applied to the two inputs of the gate 64.

The validation circuit 44 validates the input register 45 of the clock recovery circuit. It is controlled by the intermediate clock signal CK4 and furnishes the data signal of the input register 45. It includes a delay cell 65, similar to the cells 59 and 60; an EXCLUSIVE-OR gate 66; a delay element 67; and an inverter 68. In the cell 65, the respective clock inputs of the registers 61 and 62 receive the intermediate clock signal CK4, and the outlet gate 64 furnishes a signal applied to one input of the gate 66. This gate has its other input connected to ground, and its output furnishes the input signal to the delay element 67. The delay element 67 is similar to the others and is controlled by the output signal of the up-down counter 57 of the clock phasing circuit 43, to furnish the data signal of the input register 45 by way of the inverter 68.

The deserializer-decoder 19 will now be described, with reference to FIG. 6. It has one input 19a receiving the transmission signal TS of the amplifier 17; a clock input 19b connected to the clock bus 18b originating in the clock recuperator 18; and an outlet bus 19c furnishing the recovered data signal RD. The deserializer-decoder 19 includes the following: a sampling circuit, composed of nine leading edge input registers 69, respectively controlled by the nine clock signals CL0–CL7 and CL9 picked up by the bus 18b and all receiving the transmission signal TS; and an output circuit composed of eight EXCLUSIVE-OR gates 70 with two inputs, and two inverters 71, 72. The two inputs of each gate 70, respectively, receive the output signal of the corresponding register 69 and the output signal of the preceding register 69. Thus for example the first gate 70, at the top of the drawing, receives the output signals of the registers 69 controlled by the clock signals CL0 and CL9; the second gate 70 receives those of the registers 69 that are controlled by the clock signals CL1 and CL0, and so forth, and the eighth gate 70 receives those of the registers 69 that are controlled by the clock signals CL7 and CL6. The output of the fourth gate 70 is connected to the inverter 71, and the output of the register 69 controlled by the clock signal CL9 is connected to the inverter 72. The respective outputs of the first through the last gate 70 furnish the data bits D2, D3, OP, D4, D5, D6, D7, and the output of the inverter 72 furnishes the data bit D0. The odd parity bit OP is inverted to constitute the parity bit PA. The data and parity bits are applied to the outlet bus 19c.

Figure 6:
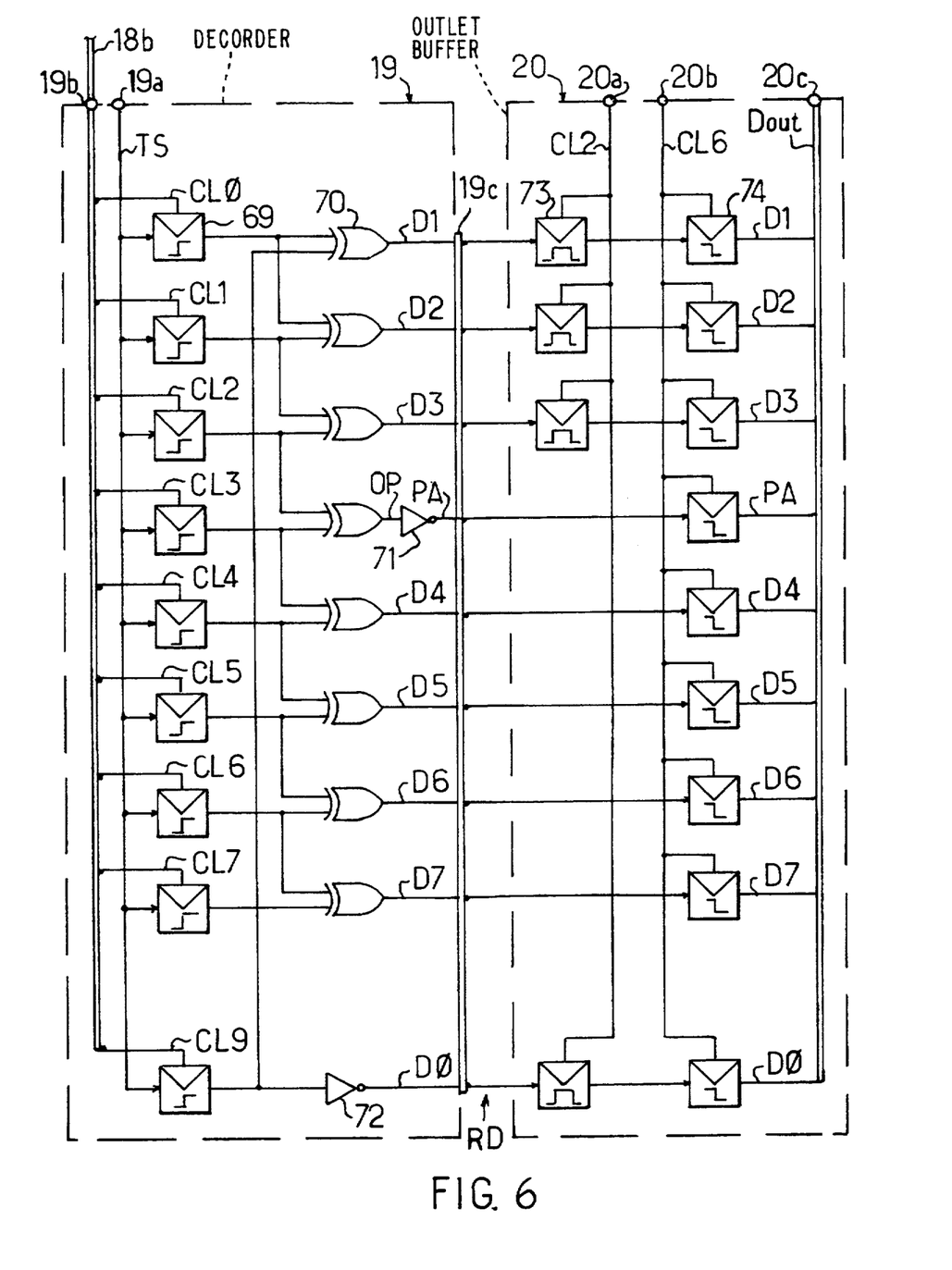
FIG. 6 illustrates the electric circuit of the deserializer-decoder and of the output buffer included in the receiver of the transmission system shown in FIG. 1.

FIG. 6 also schematically shows the electrical circuit of the outlet buffer 20 shown in FIG. 1. The outlet buffer 20 has one signal input connected to the bus 19c, two clock inputs 20a and 20b receiving the respective clock signals CL2 and CL6, and an outlet bus 20c furnishing the outlet signal Dout of the receiver 13 of the system 10 according to the invention. The buffer 20 includes four level registers 73 and nine trailing edge output registers 74. The level registers 73 are controlled by the clock signal CL2 and have their data inputs receiving the bits D1–D3 and D0, respectively, of the input bus 19c. The output registers 74 are controlled by the clock signal CL6. Four of the registers 74 have their respective data inputs connected to the outputs of the four level registers 73. The other registers 74 have their respective inputs receiving the parity bit PA and the data bits D4–D7 of the bus 19c. The respective outlets of all the registers 74, in the order indicated in FIG. 4A, furnish the data bits D0–D7 and the parity bit PA, to restore an output signal Dout that is identical to the input signal DS of the transmitter 12.

Figure 7:
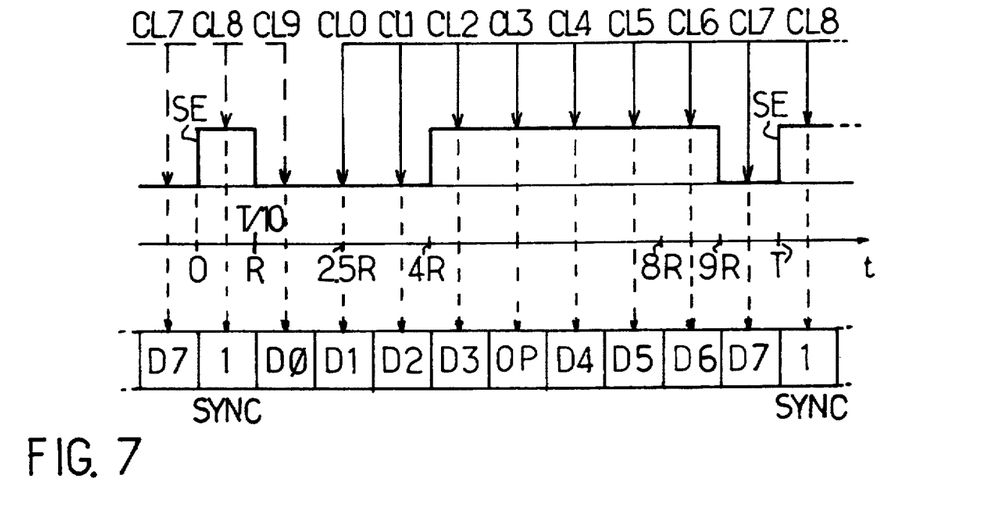
FIG. 7 reproduces FIGS. 4A and 4F and schematically illustrates the function of the deserializer-decoder shown in FIG. 6.

FIG. 7 takes the example of 4E again, with reference to the time axis t, and for ease in reading, FIG. 4B, and schematically illustrates the operation of the clock recuperator 18 shown in FIG. 5. In the recuperator 18, the signal TS is applied to the clock input of the leading edge register 45. This register is assumed to be validated by the validation circuit 44, to be controlled at the passage, at time t=0, of a synchronizing edge SE. Just after t=0, the register 45 is controlled by the validation circuit 44 so that it does not react to the corresponding edges of the following data and odd parity bits, and reacts to only the next synchronizing edge SE at time t=T. The frequency of the clock signal formed by the synchronizing edges SE detected by the register 45 is accordingly $\frac{1}{2}$T. In other words, the register 45 furnishes an intermediate clock signal CK0 having a frequency half that of the clock signal CL0 transmitted. In the phase-locked loop 46, the ten delay elements 480–489 successively produce ten identical delays sharing the half-period T of the clock signal CK0 and furnishing the ten intermediate clock signals CK0–CK9 and the negative feedback signal FB. Because of the period 2T of the signal CK0, this signal is in phase opposition with the negative feedback signal FB and thus passes through the inverter 51, so that these two signals will be in phase at the respective inputs of the comparator 49. For the same reason, the logical adder 47 and the circuit 46 form a frequency multiplier with a factor of 2, in order to furnish the ten clock signals CL0–CL9 successively, and uniformly delayed among themselves, within the period T, like those generated upon transmission. In the example shown, the synchronizing edge SE detected by the register 45 undergoes a first delay Θ1 upon passing through this register, and a second delay Θ2 in the delay element 54, to constitute one edge of the intermediate clock signal CK0. This latter edge undergoes a third delay Θ3 in the gate 52, to become one edge of the auxiliary clock signal CL0.

Figure 4D:
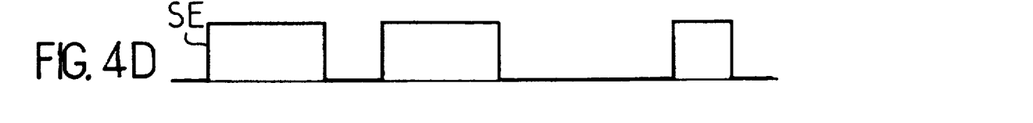
Figure 4E:
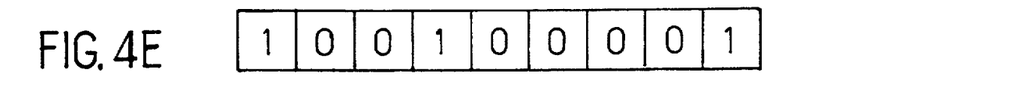
Figure 4F:
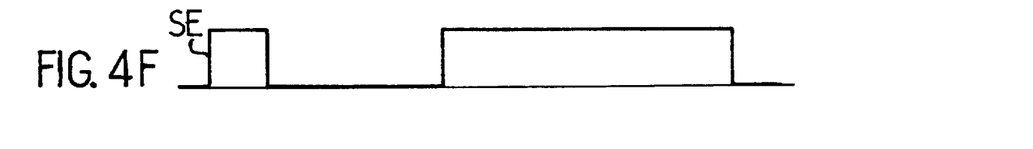

It is apparent from FIG. 4D, 4F and 7 that the last possible leading edge in the signal TS corresponds to the data bit D6 at time t=8T/10. After that time, the validation circuit 44 can validate the signal input of the register 45 to detect the next leading synchronizing edge at time t=T. In the example shown, the validation of the register 45 is done at time t=9T/10, determined by the accumulation of the following delays of the synchronizing edge SE beginning at time t=0. This edge initially undergoes the delays Θ1 and Θ2, to constitute the value and edge of the signal CK0. If the duration of a delay of each element 480–489 is designated as Θ4, then the delay of the signal CL4 with respect to the signal CL0 is 4 Θ4. The signal CK4 is selected as an input signal of the validation circuit 44. In the circuit 44, the signal CK4 passes, in the delay cell 65, through one of the registers 61 and 62, depending on whether its edge is leading or trailing, and the gate 64, and then the EXCLUSIVE-OR gate 66, the delay element 67 and the inverter 68. In practice, it is assumed that all the registers have identical delays Θ1, and all the EXCLUSIVE-OR gates have identical delays Θ3, that the inverters do not delay the signals, and that the delays Θ2 are identical for the delay elements 54 and 67. The accumulated delays beginning at the register 45 add up to 9T/10. In other words, Θ1+Θ2+4 Θ4+Θ1+2 Θ3+Θ2=2 Θ1+2 Θ2+2 Θ3+4 Θ4=9T/10. At this point in the description, all the delays in this formula are known, expect for Θ2, which will now be learned from the description of the operation of the clock phasing circuit 43 of the clock recuperator 18.

The circuit 43 synchronizes the phasing of the clock signals CL0–CL9 at half the width of the respective bits of the transmission signal TS beginning at each synchronizing edge SE detected by the register 45. The half-width R/2 (0.5T/10) of the signal representing one bit corresponds in practice to the range of maximum stability of the signal, and thus optimizes determination of the logical value of each bit. In the example shown in FIG. 7, the signal CL0 is phased at 2.5T/10, such that Θ1+Θ2+Θ3=2.5T/10. The delay produced by the element 54 is accordingly Θ2=2.5T/10−Θ1−Θ3. The synchronization of the phasing of the clock signal CL0 is done by the phase comparator 58, which compares the phase of the clock signal CL5 with that of the clock signal CL0 in phase opposition, delayed successively in the delay element 55, the delay cells 59 and 60, and the delay elements 56. The total delay is thus Θ2+Θ1+Θ3+Θ1+Θ3+Θ2=2(Θ1+Θ2+Θ3) and must confirm the equation 2(Θ1+Θ2+Θ3)=5T/10. The up-down counter 57 adjusts the duration of Θ2 in the elements 54, 55, 56 and 57 to satisfy this equation. Accordingly, the phasing of the clock signals CL0–CL9 is adjusted to the respective delays 2.5R–11.5R determined with respect to a synchronizing edge SE, such that each clock signal corresponds to the range of maximum stability of the representative signal for each bit. Moreover, the clock phasing circuit adjusts the delay of 9R of the validation signal of the register 45 with respect to each synchronizing edge detected by this register.

Figure 8:
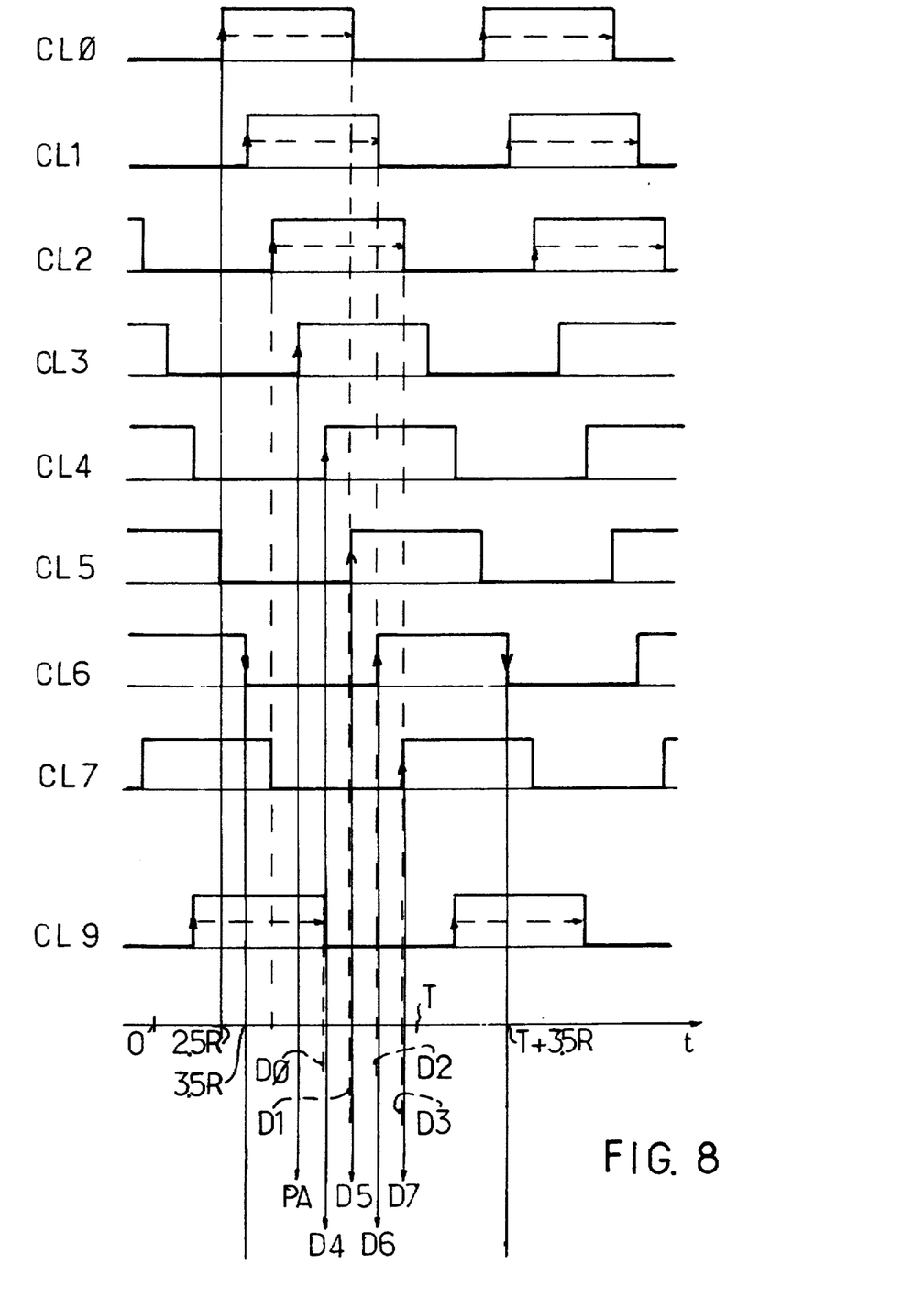
FIG. 8 is a timing diagram of the auxiliary clock signals recovered and applied to the deserializer-decoder and output buffer that are shown in FIG. 6, to illustrate their function.

FIGS. 7 and 8 illustrate the function of the deserializer-decoder 19 shown in FIG. 6. FIG. 8 shows the ten recovered clock signals CL0–CL9 with respect to the time axis indicated in FIG. 7, and illustrates the recovery of the respective data bits in correspondence with the leading edges of the clock signals. In the deserializer-decoder 19, the clock signal CL8 is not used, since it would recover the synchronizing bit SYNC, which is always equal to 1 and is useless in the data signal to be restored. It can be seen from FIGS. 6, 7 and 8 that the clock signals CL0–CL7 and CL9 respectively recover the data bits D1–D3, the odd parity bit OP, and the data bits D4–D7 and D0. If for the preceding word, the clock signal CL9 shown in dashed lines in FIGS. 7 and 8 samples a value of logical 0, this value corresponds to an equivalent edge of a data bit D0 of logical 1 value. The inverter 72 is thus sufficient to determine the value of the bit D0. The other bits are determined consequently by the EXCLUSIVE-OR gates 70 that react to the presence of an edge sampled by the corresponding registers 69. The odd parity bit OP thus recovered is inverted at 71 to restore the parity signal PA. Given that the bit D0 is determined by the clock signal CL9 of the preceding word, all the bits of the data signal RD should be put into order, to constitute a data signal identical to that transmitted.

Putting the bits of the restored signal RD into order is done in the output buffer 20 shown in FIG. 6, in the manner illustrated in FIG. 9. Putting them into order begins with the action of the clock signal CL2 on the registers 73. When the data bits D0–D3 leave the deserializer-decoder 19, the signal CL2 has the state of logical 0 and blocks the level registers 73. At time t=4.5T/10, the clock signal CL2 assumes the state of logical 1 and controls the memorization of the data bits D0–D3 in the registers 73. During this time, the bits PA and D4–D7 are output. Under these conditions, all the bits D0–D3, PA, D4–D7 of the same word are present at the respective inputs of the registers 74. At time t=T+3.5T/10, the registers 74 memorize this word. It should be noted that the next data bits D0–D3 have already been sampled, but are waiting at the input of the output buffer 20 for the next clock signal CL2 before they enter.

In summary, the apparatus according to the invention for sampling data recurring with a period R in the transmission signal TS has the following characteristics and advantages. It includes a circuit 43 for phasing ten clock signals CL0–CL9 with respect to a synchronizing edge SE of the transmission signal. This edge recurs with the period 10R=T in the transmission signal. The phasing circuit 43 adjusts the delay between each of the clock signals and each synchronizing edge SE. It assigns a different delay value to the ten clock signals. The delay of the signal CL0 is 2.5R. The delays of the next signals CL1–CL9 are successively longer than one period R. In other words, the delay of the signal CL0 is equal to the sum of two periods R plus the half-period R/2 corresponding to the zone of maximum stability of the data signal in the period R. More generally, the delay of each of the clock signals CL0–CL9 is equal to a respective integer n, between 2 and 11, of periods R, added to half of the period R. Each delay is adjusted to its corresponding value (n+0.5)R by the phase-locked loop 58 and the delay elements 54, 55 and 56. It should be noted that the minimum delay of 2.5R of the signal CL0 has been selected for the sake of the high speeds provided. At high speeds, the fixed and necessary transit times Θ1 and Θ3 of the signals in the components are close to R/2 and may exceed this value. A delay of 2.5R offers the advantage of taking these transit times into account and of enabling adding and simple adjusting of the variable delays Θ2. It follows that the sampling apparatus according to the invention adapts to any variation or change in operating frequency and controls any delay independently of the speed and technological deviations in characteristics of the components among different semiconductor chips. The invention also benefits judiciously from embodiment of the transmitter and receiver of the transmission system in the form of integrated circuits. The uniformity in characteristics of the transistors in the same integrated circuit makes it easy to have identical delays Θ1, Θ2, Θ3 and Θ4 and to equalize the propagation times of the signals, in particular those in the clock phasing circuit 43.

Numerous variants may be made in the exemplary embodiment shown. For example, the number n may be zero and may determine a conventional delay of R/2. This is even easier, the lower the speeds. Similarly, the invention makes it possible to adjust the phasing in each period to a value α unlike 0.5 that is often used in practice. It is sufficient that the clock signal at the value αR corresponds to a zone of stability of the data signal within the period R. In addition, the edge of the data signal TS may be some edge different from the synchronizing edge SE. It may be a real or apparent data edge, such as the edges used in the prior art transmission system described in the background section of the present application. Generally, a sampling apparatus according to the invention is characterized in that the phasing circuit adjusts the delay between a clock signal and one edge of the data signal to a value (n+α)R, where n is a positive integer or 0, and α is a positive number less than 1.

I claim:

1. A data sampling apparatus comprising:
   a source of a serial data signal recurring with a period R and including a reference edge recurring with a period NR where N is an integer greater than or equal to 1;
   a source of a first clock signal recurring with said period NR;
   a phasing circuit connected to said serial data signal source and said source of said first clock signal, said phasing circuit comprising delay means and means for adjusting said delay means for providing a delay between said first clock signal and said reference edge equal to (n+α)R, where n is a positive integer or 0, and α is a positive number less than 1 and greater than 0, wherein α is determined such that αR corresponds to a zone of stability of said serial data signal within said period R, said delay means being connected to said first clock signal to generate at least one second clock signal recurring with said period NR and delayed from the first clock signal by said delay; and
   sampling means controlled by said at least one second clock signal to sample said serial data signal and provide an output signal.

2. The apparatus of claim 1, wherein said serial data signal further includes clock information and said source of said first clock signal comprises means for generating said first clock signal from said clock information.

3. The apparatus of claim 1, wherein N is greater than 1 and said delay means comprises N delay means each providing a delay equal to said period R, said N delay means being connected to said first clock signal to generate N clock signal each recurring with said period NR and successively delayed by said period R.

4. The apparatus of claim 2, wherein N is greater than 1 and said delay means comprises N delay means each providing a delay equal to said period R, said N delay means being connected to said first clock signal to generate N clock signals each recurring with said period NR and successively delayed by said period R.

5. The apparatus of claim 1, wherein said adjusting means comprises a phase locked loop connected to said source of a first clock signal.

6. The apparatus of claim 2, wherein said adjusting means comprises a phase locked loop connected to said source of said first clock signal.

7. The apparatus of claim 3, wherein said adjusting means comprises a phase locked loop connected to said source of said first clock signal.

8. The apparatus of claim 1, wherein said reference edge is a synchronizing edge.

9. The apparatus of claim 1, wherein said reference edge is a data edge of said serial data signal.

10. The apparatus of claim 9, wherein said data edge is an apparent data edge generated from said serial data signal.

11. The apparatus of claim 1, wherein said phasing circuit delays said data signal by a predetermined delay and said delay of said phasing circuit includes said predetermined delay.

12. The apparatus of claim 1, wherein said period R is a variable period.

13. A system for digital transmission of data, comprising means for transmitting a serial data signal recurring with a period R and including a reference edge recurring with a period NR where N is an integer greater than or equal to 1, means for providing clock information, and means for receiving said serial data signal and said clock information, said receiving means comprising means for generating from said clock information a first clock signal recurring with said period NR;
   a phasing circuit connected to said means for transmitting said serial data signal and said means for generating said first clock signal, said phasing circuit comprising delay means and means for adjusting said delay means for providing a delay between said first clock signal and said reference edge equal to (n+α)R, where n is a positive integer or 0, and α is a positive number less than 1 and greater than 0, wherein α is determined such that αR corresponds to a zone of stability of said serial data signal within said period R, said delay means being connected to said first clock signal to generate at least one second clock signal recurring with said period NR and delayed from the first clock signal by said delay; and
   sampling means controlled by said at least one second clock signal to sample said serial data signal and provide an output signal.

14. The system of claim 13, wherein said serial data signal further includes said clock information.

15. The system of claim 13, wherein N is greater than 1 and said delay means comprises N delay means each providing a delay equal to said period R, said N delay means being connected to said first clock signal to generate N clock signals each recurring with said period NR and successively delayed by said period R.

16. The system of claim 14, wherein N is greater than 1 and said delay means comprises N delay means each providing a delay equal to said period R, said N delay means being connected to said first clock signal to generate N clock signals each recurring with said period NR and successively delayed by said period R.

17. The apparatus of claim 13, wherein said adjusting means comprises a phase locked loop connected to said means for generating a first clock signal.

18. The apparatus of claim 14, wherein said adjusting means comprises a phase locked loop connected to said means for generating a first clock signal.

19. The apparatus of claim 15, wherein said adjusting means comprises a phase locked loop connected to said means for generating a first clock signal.

20. The apparatus of claim 13, wherein said reference edge is a synchronizing edge.

21. The apparatus of claim 13, wherein said reference edge is a data edge of said serial data signal.

22. The apparatus of claim 21, wherein said data edge is an apparent data edge generated from said serial data signal.

23. The apparatus of claim 13, wherein said phasing circuit delays said data signal by a predetermined delay and said delay of said phasing circuit includes said predetermined delay.

24. The system of claim 13, wherein said receiving means further comprises decoding means (19) for decoding said output signal of the sampling means.

25. The system of claim 13, wherein said receiving means further comprises means for deserializing said output signal of said sampling means and providing an output signal comprising parallel data bits.

26. The system of claim 25, wherein said receiving means further comprises ordering means (20) for putting said signal data bits in order.

* * * * *